(12) United States Patent
Hendricksen et al.

(10) Patent No.: US 9,236,914 B2
(45) Date of Patent: Jan. 12, 2016

(54) NFC DEVICE AND COMMUNICATION METHOD

(71) Applicant: NXP B.V., Eindhoven (NL)

(72) Inventors: Ruud Hendricksen, Beek en Donk (NL); Oswald Moonen, Eindhoven (NL)

(73) Assignee: NXP, B.V., Eindhoven (NL)

( * ) Notice: Subject to any disclaimer, the term of this patent is extended or adjusted under 35 U.S.C. 154(b) by 44 days.

(21) Appl. No.: 14/072,736

(22) Filed: Nov. 5, 2013

(65) Prior Publication Data

US 2014/0127995 A1 May 8, 2014

(30) Foreign Application Priority Data

Nov. 6, 2012 (EP) .................................... 12191425

(51) Int. Cl.
*H04B 5/00* (2006.01)
*G06K 7/00* (2006.01)
*G06K 7/10* (2006.01)
*G06K 19/07* (2006.01)

(52) U.S. Cl.
CPC ............ *H04B 5/0056* (2013.01); *G06K 7/0008* (2013.01); *G06K 7/10148* (2013.01); *G06K 7/10237* (2013.01); *G06K 19/0723* (2013.01)

(58) Field of Classification Search
USPC ................ 455/41.1, 41.2, 41.3; 235/487, 492
See application file for complete search history.

(56) References Cited

U.S. PATENT DOCUMENTS

| 8,915,447 | B2 * | 12/2014 | Jain et al. ....................... 235/492 |
| 8,934,837 | B2 * | 1/2015 | Zhu et al. ...................... 455/41.1 |
| 2009/0152364 | A1 * | 6/2009 | Spivey, Jr. ...................... 235/492 |
| 2010/0044444 | A1 | 2/2010 | Jain et al. |
| 2013/0309966 | A1 * | 11/2013 | Aldana et al. ................. 455/41.1 |

OTHER PUBLICATIONS

Extended European Search Report for Patent Appln. No. 12191425.3 (Apr. 11, 2013).

* cited by examiner

*Primary Examiner* — Sonny Trinh

(57) ABSTRACT

According to an aspect of the invention, an NFC device for communicating with an NFC reader is conceived, the NFC device comprising an NFC integrated circuit, an antenna unit connected to said NFC integrated circuit, and a detuning circuit, wherein the detuning circuit is arranged to cause a periodic detuning of the antenna unit to a detuned state, such that data transmission between the NFC device and the NFC reader may take place periodically while the NFC device and the NFC reader remain within communication range of each other.

7 Claims, 3 Drawing Sheets

NFC DEVICE AND COMMUNICATION METHOD

CROSS-REFERENCE TO RELATED APPLICATIONS

This application claims the priority under 35 U.S.C. §119 of European patent application no. 12191425.3, filed on Nov. 6, 2012, the contents of which are incorporated by reference herein.

FIELD OF THE INVENTION

The invention relates to an NFC device for communicating with an NFC reader. The invention also relates to a cover comprising an NFC device. The invention further relates to a method of communication between an NFC device and an NFC reader.

BACKGROUND OF THE INVENTION

NFC-enabled mobile phones have become increasingly popular. Also, phone sleeves or covers for such mobile phones have entered the market. These covers can be equipped with integrated sensors which are able to measure physical phenomena, such as temperature, humidity and pressure. The sensors produce measurement results that are sent from the cover to the mobile device, which is typically done via electrical connections between the cover and the mobile phone. For example, this can be done via a docking plug of the mobile phone. Subsequently, the measurement results can be processed by the mobile phone. However, creating electrical connections between the cover and the mobile phone is cumbersome and expensive.

SUMMARY OF THE INVENTION

It is an object of the invention to simplify the communication between an NFC-enabled mobile device and a cover of the kind set forth. This object is achieved by an NFC device as defined in claim 1, a cover as defined in claim 6, and a method of communication between an NFC device and an NFC reader as defined in claim 8.

Since an NFC-enabled mobile device is always equipped with an NFC reader, it is possible, in principle, to embed an NFC device (NFC tag) in the cover and to transmit data from the cover to the mobile device via near-field communication. However, NFC requires that an NFC device repeatedly leaves and re-enters the field generated by the NFC reader in order to transmit data to said reader in a periodic fashion. This is not the case if the mobile device is kept within the cover all the time, because then the NFC device and the NFC reader remain within communication range of each other. Therefore, according to the invention, a detuning circuit within the NFC device causes a periodic detuning of the antenna unit to a detuned state, such that data transmission between the NFC device and the NFC reader may take place periodically while the NFC device and the NFC reader remain within communication range of each other. Only when the antenna unit is not in the detuned state, data transmission is possible between the NFC device and the NFC reader. Thus, a repeated leaving and re-entering the field generated by the NFC reader is simulated by a periodic detuning of the antenna unit.

According to an aspect of the invention, an NFC device for communicating with an NFC reader is conceived, the NFC device comprising an NFC integrated circuit, an antenna unit connected to said NFC integrated circuit, and a detuning circuit, wherein the detuning circuit is arranged to cause a periodic detuning of the antenna unit to a detuned state, such that data transmission between the NFC device and the NFC reader may take place periodically while the NFC device and the NFC reader remain within communication range of each other.

According to an exemplary embodiment of the invention, the detuning circuit is arranged to receive a detuning signal from a processing unit comprised in said NFC device, and the detuning circuit is arranged to detune the antenna unit in response to receiving said detuning signal.

According to a further exemplary embodiment of the invention, the detuning circuit causes said periodic detuning of the antenna unit to a detuned state by periodically short-circuiting a coil of said antenna unit.

According to a further exemplary embodiment of the invention, the detuning circuit comprises a first capacitor connected to a tuning capacitance and to a first input of the antenna unit, a second capacitor connected to a second input of the antenna unit, a first transistor connected to the first capacitor and to ground, a second transistor connected to the second capacitor and to ground, wherein the base of the first transistor and the base of the second transistor are connected to an output of the processing unit via a first resistor and a second resistor, respectively, such that the first transistor and the second transistor are arranged to be activated by the detuning signal from the processing unit, thereby enabling said short-circuiting of the coil of the antenna unit.

According to a further exemplary embodiment of the invention, the antenna unit is in the detuned state when it has an operating frequency that substantially deviates from 13.56 MHz.

According to another aspect of the invention, a cover is conceived which comprises an NFC device of the kind set forth, wherein said cover is arranged to accommodate a mobile device comprising said NFC reader.

According to a further exemplary embodiment of the invention, said cover comprises at least one sensor which is arranged to measure one or more physical phenomena, and the NFC device is arranged to transmit measurement results produced by said sensor to the NFC reader when the antenna unit is not in the detuned state.

According to a further aspect of the invention, a method of communication between an NFC device and an NFC reader is conceived, the NFC device comprising an NFC integrated circuit, an antenna unit connected to said NFC integrated circuit, and a detuning circuit, wherein the detuning circuit causes a periodic detuning of the antenna unit to a detuned state, such that data transmission between the NFC device and the NFC reader takes place periodically while the NFC device and the NFC reader remain within communication range of each other.

BRIEF DESCRIPTION OF THE DRAWINGS

The invention will be described in more detail with reference to the appended drawings, in which.

DESCRIPTION OF EMBODIMENTS

Figure 1:
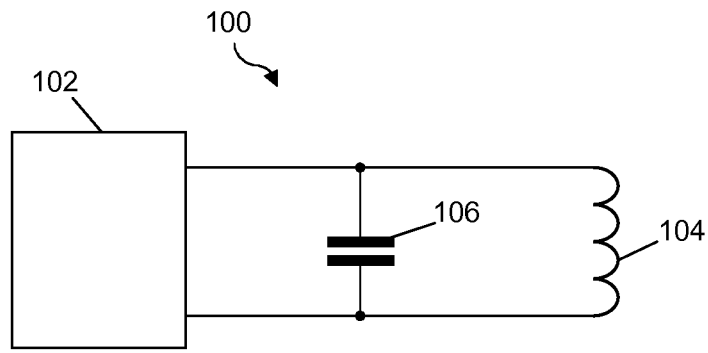
FIG. 1 shows a portion of a conventional NFC device.

FIG. 1 shows a portion of a conventional NFC device. The NFC device 100 comprises an NFC integrated circuit 102, an antenna unit 104 and a tuning capacitance 106. The tuning capacitance 106 is relatively small and it is used to tune the coil of the antenna unit exactly to an operating frequency of 13.56 MHz.

Figure 2:
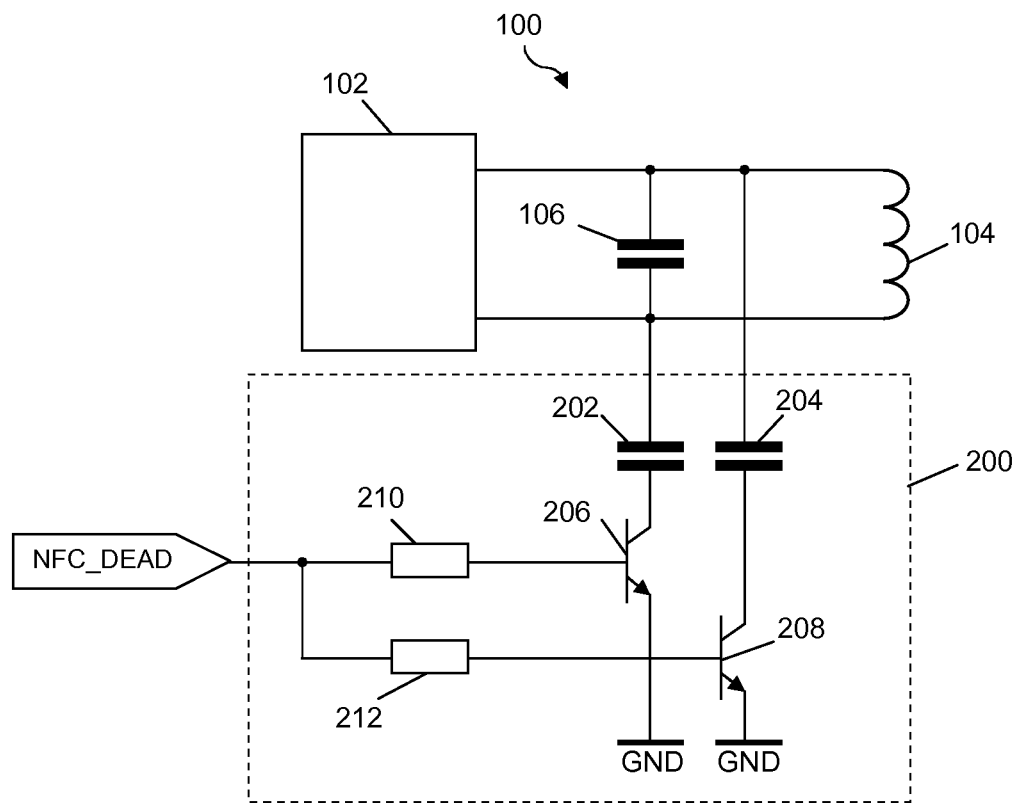
FIG. 2 shows a portion of an NFC device according to an exemplary embodiment of the invention.

FIG. 2 shows a portion of an NFC device according to an exemplary embodiment of the invention. The NFC device 100 according to this exemplary embodiment has been extended with a detuning circuit 200. The detuning circuit 200 is arranged to cause a periodic detuning of the antenna unit 104 under control of a detuning signal NFC_DEAD.

The detuning circuit 200 comprises a first capacitor 202 connected to the tuning capacitance 106 of the NFC device 100 and to a first input of the antenna unit 104, a second capacitor 204 connected to a second input of the antenna unit 104, a first transistor 206 connected to the first capacitor 202 and to ground GND, a second transistor 208 connected to the second capacitor 204 and to ground GND. In operation, the detuning signal NFC_DEAD is fed to the base of the first transistor 206 and the base of the second transistor 208 via a first resistor 201 and a second resistor 212, respectively. If the detuning signal NFC_DEAD goes high, then the first transistor 206 and the second transistor 208 will be activated and, as a consequence, the coil of the antenna unit 104 will be short-circuited to ground GND.

Figure 3:
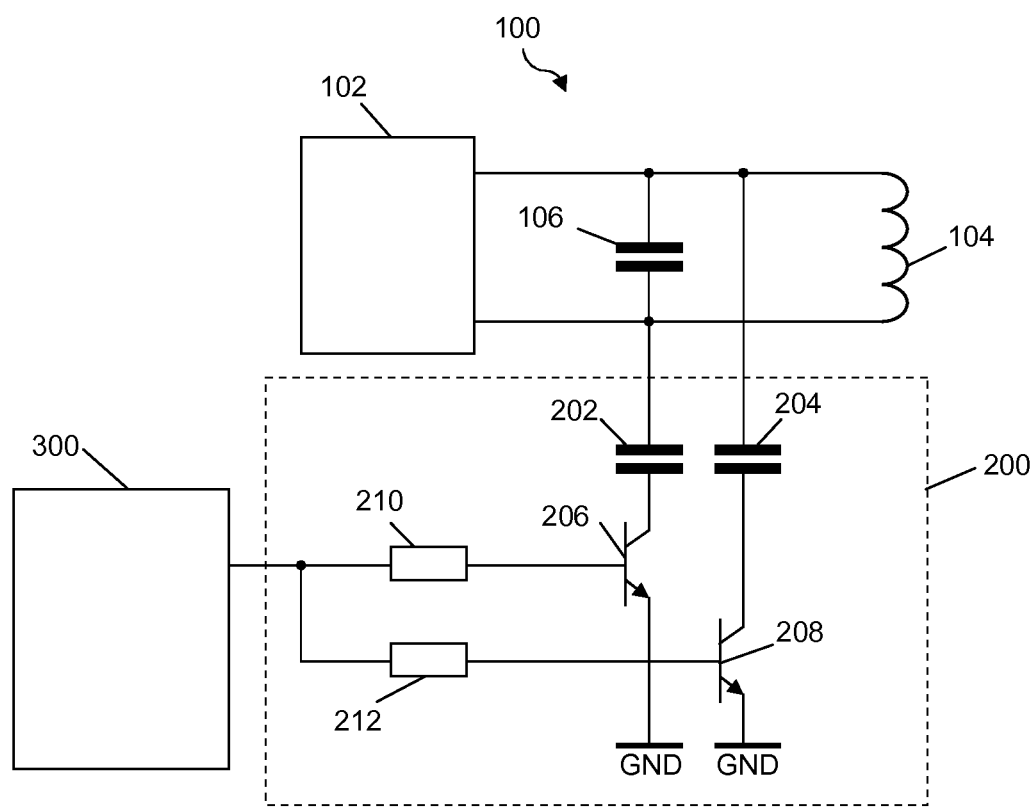
FIG. 3 shows a portion of a system comprising an NFC device according to an exemplary embodiment of the invention.

FIG. 3 shows a portion of a system comprising an NFC device according to an exemplary embodiment of the invention. This system may form part of a cover which accommodates an NFC-enabled mobile phone, for example. The system comprises the NFC device 100 extended with the detuning circuit 200 and a processing unit 300. The processing unit 300 is arranged to generate and output the detuning signal NFC_DEAD. The processing unit 300 may be implemented as microcontroller, for example. The transistors 206, 208 may be implemented as field-effect transistors (FETs), for example.

In operation, when the detuning signal NFC_DEAD is high, the transistors will conduct and basically the coil is shorted to ground by the low RDSon FET resistance, making it invisible for an NFC reader on 13.56 MHz. When the detuning signal NFC_DEAD is low again, a rest capacitance is left because of the output capacity of the transistors. This rest capacitance can partly take over the role of the tuning capacitance 106. In fact, the tuning capacitance 106 may in principle be omitted. The first capacitor 202 and the second capacitor 204 are relatively large in comparison with the transistor capacitance (when open) so they do not have a frequency influence, but they can short the coil when the transistors are closed. The elegancy of this solution is that there are no switching components needed in series with the coil. This avoids a deterioration of the quality of the coil and makes easy switching with respect to ground possible. When the coil is shorted to ground, the NFC field from the reader is still strong enough to penetrate the cover. Thus, when the antenna unit of the NFC device 100 is in the detuned state, other NFC devices (tags) can still enter and leave the NFC field generated by the reader.

Figure 4:
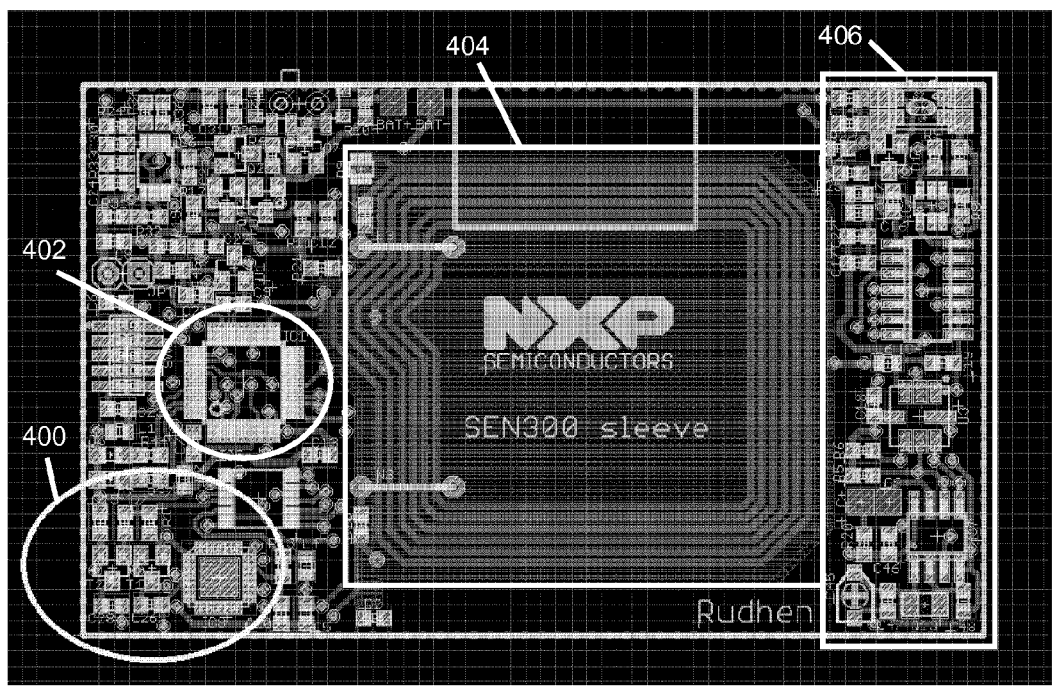
FIG. 4 shows a printed circuit board design according to an exemplary embodiment of the invention.

FIG. 4 shows a printed circuit board (PCB) design according to an exemplary embodiment of the invention. The NFC device 100 extended with the detuning circuit 102 is shown in a first oval 400. The antenna unit 104 is clearly visible in a first rectangle 404 in the center of the PCB. The processing unit 300 is visible in a second oval 402 on the PCB. Sensors are integrated on the right side of the PCB in a second rectangle 406.

It should be noted that the position of a coil in a mobile phone, which must be aligned with the position of the coil in a cover in order to enable proper communication, may differ per phone brand. For example, in a Google Nexus S phone and a Samsung Galaxy S3 phone, the position of the coil is such that it is compatible with the PCB design as shown in FIG. 4. The skilled person will appreciate that the antenna unit 104 may be positioned differently in accordance with the constraints imposed by the design of the phone.

The on-board microcontroller 300—in this case a LPC11U14 processor produced by NXP Semiconductors—controls the detuning signal NFC_DEAD in order to trigger an NFC transaction with the phone. An NFC transaction is triggered by making the detuning signal NFC_DEAD low. Sensors (temperature and pressure) and a real-time clock (RTC) are placed on the right side of the PCB, in the second rectangle 406. The low-power design consumes only a few µA while in deep-sleep mode. The battery is charged from the NFC field (with a second coil, not shown). Based on the RTC—that is used as a timer device—the NFC device 100 is woken up, the sensor measurements are performed and the NFC transaction is triggered.

In this example, the on-board processor 300 can write/read data to/from the NFC device 100 via the Universal Asynchronous Receiver/Transmitter (UART) interface of the processor. Thus, in this case the NFC tag has a wired connection to the host device (processor), so it is in fact a so-called "Connected Tag". The mobile phone can write/read data to/from the NFC device 100 via the wireless NFC connection.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 NFC device
102 NFC IC
104 antenna unit
106 tuning capacitance
200 detuning circuit
202 first capacitor
204 second capacitor
206 first transistor
208 second transistor
210 first resistor
212 second resistor
NFC_DEAD detuning signal
GND ground
300 processing unit
400 first oval
402 second oval
404 first rectangle
406 second rectangle

The invention claimed is:
1. An NFC device for communicating with an NFC reader, the NFC device comprising an NFC integrated circuit,
an antenna unit connected to said NFC integrated circuit,
wherein the NFC device further comprises a detuning circuit,
wherein the detuning circuit is arranged to cause a periodic detuning of the antenna unit to a detuned state, such that data transmission between the NFC device and the NFC reader may take place periodically while the NFC device and the NFC reader remain within communication range of each other;
wherein the detuning circuit does not switch the antenna unit off during the periodic detuning;
wherein the detuning circuit is arranged to receive a detuning signal from a processing unit, and
wherein the detuning circuit is arranged to detune the antenna unit in response to receiving said detuning signal.

2. An NFC device as claimed in claim 1,
wherein the detuning circuit causes said periodic detuning of the antenna unit to a detuned state by periodically short-circuiting a coil of said antenna unit.

3. An NFC device as claimed in claim 2,
wherein the detuning circuit comprises a first capacitor connected to a tuning capacitance and to a first input of the antenna unit, a second capacitor connected to a second input of the antenna unit, a first transistor connected to the first capacitor and to ground (GND), a second transistor connected to the second capacitor and to ground (GND),
wherein the base of the first transistor and the base of the second transistor are connected to an output of the processing unit via a first resistor and a second resistor, respectively, such that the first transistor and the second transistor are arranged to be activated by the detuning signal (NFC_DEAD) from the processing unit, thereby enabling said short-circuiting of the coil of the antenna unit.

4. An NFC device as claimed in claim 1,
wherein the antenna unit is in the detuned state when it has an operating frequency that substantially deviates from 13.56 MHz.

5. A cover comprising an NFC device as claimed in claim 1,
wherein said cover is arranged to accommodate a mobile device comprising said NFC reader.

6. A cover as claimed in claim 5,
wherein said cover comprises at least one sensor which is arranged to measure one or more physical phenomena, and
wherein the NFC device is arranged to transmit measurement results produced by said sensor to the NFC reader when the antenna unit is not in the detuned state.

7. A method of communication between an NFC device and an NFC reader, the NFC device comprising an NFC integrated circuit, an antenna unit connected to said NFC integrated circuit, characterized in that the NFC device further comprises a detuning circuit,
wherein the detuning circuit causes a periodic detuning of the antenna unit to a detuned state, such that data transmission between the NFC device and the NFC reader takes place periodically while the NFC device and the NFC reader remain within communication range of each other;
wherein the detuning circuit does not switch the antenna unit off during the periodic detuning;
wherein the detuning circuit is arranged to receive a detuning signal from a processing unit, and
wherein the detuning circuit is arranged to detune the antenna unit in response to receiving said detuning signal.

* * * * *